United States Patent
Lippert et al.

(10) Patent No.: US 8,095,734 B2
(45) Date of Patent: Jan. 10, 2012

(54) MANAGING CACHE LINE ALLOCATIONS FOR MULTIPLE ISSUE PROCESSORS

(75) Inventors: Gary Lippert, Kasson, MN (US); Judy M. Gehman, Fort Collins, CO (US); John M. Nystuen, Burnsville, MN (US)

(73) Assignee: LSI Corporation, Milpitas, CA (US)

( * ) Notice: Subject to any disclaimer, the term of this patent is extended or adjusted under 35 U.S.C. 154(b) by 446 days.

(21) Appl. No.: 12/433,101

(22) Filed: Apr. 30, 2009

(65) Prior Publication Data

US 2010/0281219 A1 Nov. 4, 2010

(51) Int. Cl.
*G06F 12/08* (2006.01)
(52) U.S. Cl. .................................... 711/122; 711/128
(58) Field of Classification Search .................. 711/122, 711/128, 146, E12.001, E12.018
See application file for complete search history.

(56) References Cited

U.S. PATENT DOCUMENTS

| | | | |
|---|---|---|---|
| 6,725,344 B2* | 4/2004 | Pawlowski | 711/146 |
| 7,039,760 B2* | 5/2006 | Arimilli et al. | 711/118 |
| 2004/0181626 A1* | 9/2004 | Pickett | 711/3 |
| 2004/0215900 A1* | 10/2004 | Guthrie et al. | 711/146 |

\* cited by examiner

*Primary Examiner* — Vu Le
(74) *Attorney, Agent, or Firm* — Christopher P. Maiorana, PC

(57) ABSTRACT

An apparatus having a cache configured as N-way associative and a controller circuit is disclosed. The controller circuit may be configured to (i) detect one of a cache hit and a cache miss in response to each of a plurality of access requests to the cache, (ii) detect a collision among the access requests, (iii) queue at least two first requests of the access requests that establish a speculative collision, the speculative collision occurring where the first requests access a given congruence class in the cache and (iv) delay a line allocation to the cache caused by a cache miss of a given one of the first requests while the given congruence class has at least N outstanding line fills in progress.

20 Claims, 3 Drawing Sheets

MANAGING CACHE LINE ALLOCATIONS FOR MULTIPLE ISSUE PROCESSORS

FIELD OF THE INVENTION

The present invention relates to cache memories generally and, more particularly, to a method and/or apparatus for managing cache line allocations for multiple issue processors.

BACKGROUND OF THE INVENTION

A congruence class of an N-way associative cache can be over allocated due to multiple misses from a multiple issue processor to the same congruence class. The over allocation occurs where all of the "ways" of the congruence class have pending line fills when another miss occurs triggering another cache line allocation. For example, a 4-way associative cache may have 4 line fills pending (i.e., a pending line fill for each way) when another access arrives at the cache that would cause another allocation to occur.

Several existing solutions exist to deal with the over allocation. A first approach compares the addresses of the incoming requests to current requests being processed. The incoming requests are then held until results of the current requests are known. Each of the incoming requests is released in turn when safe to do so (i.e., the previous request results in a cache hit that did not cause an allocation). Otherwise, the hold is maintained on the incoming requests until a safe situation exists (i.e., after the line fill completes). The first approach avoids the over allocation by limiting the allocation to one per congruence class. However, performance is lost because some incoming requests that could be processed are held instead. The first approach prevents streaming of cache "hit" data while waiting to determine the hit or miss status of a current request for certain access patterns. For example, a user doing a series of loads to the same cache line would expect the data to be returned at the same frequency the loads were received (back-to-back) without the additional gaps caused by the holds.

A second approach sets a cache state to pending, instead of invalid, when an allocation takes place. The pending state would then remove the just-allocated cache line from a replacement policy calculation. Removal from the replacement policy calculation allows multiple requests for the same congruence class to be sent to the cache, avoiding the performance issues with the first approach. However, the second approach does not solve the issue of what to do when an allocation is triggered and all of the ways are in the pending state.

A third approach uses a separate status bit to indicate that a cache entry is in a pending state waiting for a line fill to complete, rather than encoding the pending state in the cache state bits. The second and third approaches solve the performance issue, but neither prevents the over allocation. Neither the second approach nor the third approach can determine what to do when all of the ways of a congruence class are marked pending.

SUMMARY OF THE INVENTION

The present invention concerns an apparatus having a cache configured as N-way associative and a controller circuit. The controller circuit may be configured to (i) detect one of a cache hit and a cache miss in response to each of a plurality of access requests to the cache, (ii) detect a collision among the access requests, (iii) queue at least two first requests of the access requests that establish a speculative collision, the speculative collision occurring where the first requests access a given congruence class in the cache and (iv) delay a line allocation to the cache caused by a cache miss of a given one of the first requests while the given congruence class has at least N outstanding line fills in progress.

The objects, features and advantages of the present invention include providing a method and/or apparatus for managing cache line allocations for multiple issue processors that may (i) avoid situations where a cache allocation is appropriate but no room is available for an allocation due to pending line fills, (ii) improve performance by allowing loads to consecutive addresses to stream, (iii) improve performance by allowing loads to unrelated addresses to stream, (iv) maintain load and store ordering rules, (v) allow hit-after-miss access to unrelated addresses in the same congruence class and/or (vi) allow some miss-after-miss access to unrelated addresses in the same congruence class.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Embodiments of the present invention avoid over allocating of a cache congruence class due to multiple misses to the same congruence class from concurrent access requests generated by a multiple issue processor. The access requests may include, but are not limited to, data read access requests, data write access requests, data bypass requests and instruction read access requests. Examples of multiple issue processors include, but are not limited to, a PowerPC processor, an x86 processor, an ARM processor and a MIPs processor, among others. Performance for streaming "hits" to a cache array may be maintained where the addresses are in the same cache line and/or same congruence class (e.g., cache synonyms) when an allocation has occurred and a line fill is pending. Load and store ordering rules for a processor and a bus protocol for a multiple issue processor may be maintained when multiple misses occur to the same congruence class. An over allocation of a cache congruence class is prevented while concurrently allowing streaming of cache hit read data back to the requester.

Embodiments of the present invention may only allow miss-and-allocate events to the cache up to and including the associativity of the cache (e.g., number of "cache ways"). For example, a 4-way associative cache may have up to four outstanding cache misses and four subsequent pending line fills. Cache hits may be allowed to a congruence class that has any number of pending line fills. Processing of the incoming requests may allow cache hit loads to consecutive addresses in the cache to stream uninterrupted. Cache hit loads to all unrelated addresses may also be allowed to stream. Furthermore, cache miss-and-allocate events may be prohibited where no available entries exist to accommodate the allocation.

Implementations of a cache controller in various embodiments of the present invention are generally designed to work with a Power Instruction Set Architecture (Power ISA) and a Processor Local Bus 6 (PLB6) Interface. Similar techniques may be applied to (i) any level cache (e.g., L1, L2, L3, etc.), (ii) any processor architecture (e.g., PowerPC, x86, ARM, etc.) and/or (iii) any bus interconnect (e.g., PLBx, Advanced Microcontroller Bus Architecture (AMBA), etc.) to meet the criteria of a particular application.

Figure 1:
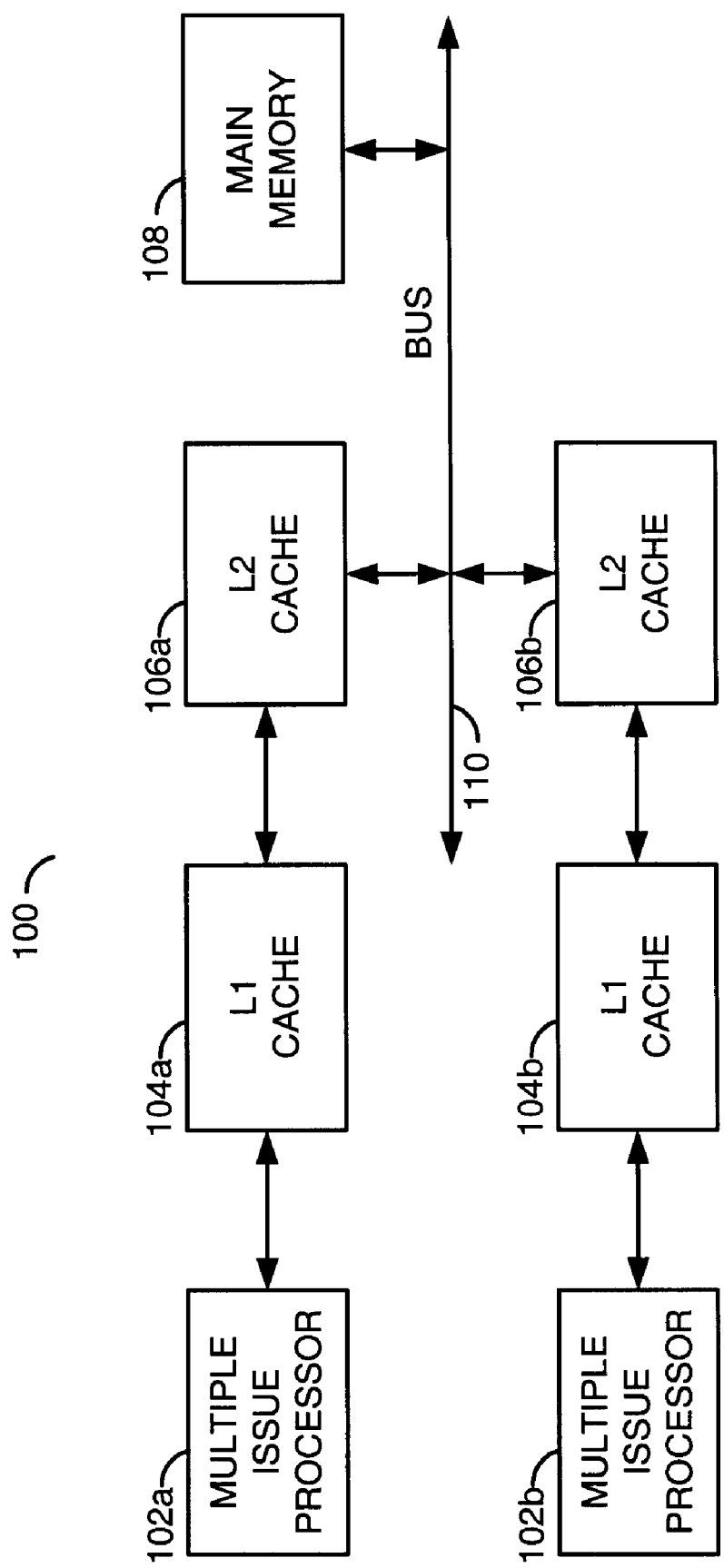
FIG. 1 is a block diagram of an example implementation of a system having a cache.

Referring to FIG. 1, a block diagram of an example implementation of a system 100 is shown. The system 100 generally comprises one or more circuits 102a-102b, one or more circuits 104a-104b, one or more circuits 106a-106b, a circuit 108 and a bus 110. Each of the circuits 102a-102b may be generically referred to as a circuit 102. Each of the circuits 104a-104b may be generically referred to as a circuit 104. Each of the circuits 106a-106b may be generically referred to as a circuit 106. The circuits 102 to 108 may represent modules and/or blocks that may be implemented as hardware, software, a combination of hardware and software, or other implementations.

Each circuit 102 may be implemented as a multiple issue processor. The circuits 102 are generally operational to issue access requests directly to the corresponding circuits 104 for both read operations and write operations. Each of the requests may correspond to data or computer programming instructions. Each of the requests may request to read an instruction/data from a virtual read address or write an instruction/data to a virtual write address. Each circuit 102 may be implemented as a PowerPC processor, an x86 processor and an ARM processor. Other multiple issue type processors may be implemented to meet the criteria of a particular application.

Each circuit 104 may implement a level one (L1) cache. The circuits 104 may be operational to provide fast L1 caching operations for the system 100. The circuits 104 generally comprises multiple cache lines or entries. Each of the cache lines may have multiple internal locations (e.g., 16 or 32 locations). Each of the internal locations may store an addressable data word or an addressable instruction. Each individual cache line may reside in a single location within the cache at any given time, but may have multiple potential locations. In some embodiments, the circuits 104 may be implemented as a direct-mapped cache. In other embodiments, the circuits 104 may be arranged as N-way associative, where N is an integer greater than 1 (e.g., N=2, 4, 8 or 16 ways). Other cache arrangements may be implemented to meet the criteria of a particular application.

Each circuit 106 may implement a level two (L2) cache. The circuits 106 are generally operational to provide L2 caching operations for the system 100. The circuits 106 generally comprises multiple cache lines or entries. Each of the cache lines may have multiple internal locations (e.g., 16 or 32 locations). Each of the internal locations may store an addressable data word or an addressable instruction. Each individual cache line may reside in a single location within the cache at any given time, but may have multiple potential locations. In some embodiments, a size of the cache lines in the circuits 106 may be different than the size of the cache lines in the corresponding circuits 104. In other embodiments, the cache line sizes of the circuits 104 and 106 may match. The circuits 106 may be arranged as N-way associative, where N is an integer greater than 1 (e.g., N=2, 4, 8 or 16 ways).

The circuits 106 may be logically situated between the circuits 104 and the circuit 108 and are generally used to reduce the access latency due to a cache miss in the circuits 104. The circuits 106 may be slower than the corresponding circuits 104 but faster than the circuit 108. Therefore, transferring a missed line from the circuits 106 to the circuits 104 generally takes less time than fetching the missing line from the circuit 108. An arrangement of the circuits 104 and the circuits 106 may be an exclusive arrangement (e.g., each line exists in only one of the caches), an inclusive arrangement (e.g., each line may exist in both of the caches) or a non-inclusive arrangement (e.g., a given line in one cache may or may not exist in another cache).

The circuit 108 may be implemented as a main memory circuit in some embodiments and a level three (L3) cache in other embodiments. The circuit 108 is generally operational to provide random access storage for data and instructions used by and created by the circuits 102. The circuit 108 may be read from and written to by the circuit 102 through the circuits 104 and the circuits 106. The circuit 108 may support any normal read policy and any normal write policy to exchange information. During an allocation operation, the circuit 108 may generate a burst of sequential words to convey the requested fill line.

The bus 110 may be implemented as a multi-drop interconnect bus, a switched bus, a point-to-point bus or any other type of bus topology. The bus 110 generally interconnects at least the circuits 106 and 108. Other devices that may be attached to the bus include, but are not limited to, one or more additional processor/L1/L2 complexes, an input/output controller, a direct memory access engine, and so on. Implementations of the bus 110 may include, but are not limited to a PLBx bus and an Advanced Microcontroller Bus Architecture (AMBA) bus. Other busses may be implemented to meet the criteria of a particular application.

Figure 2:
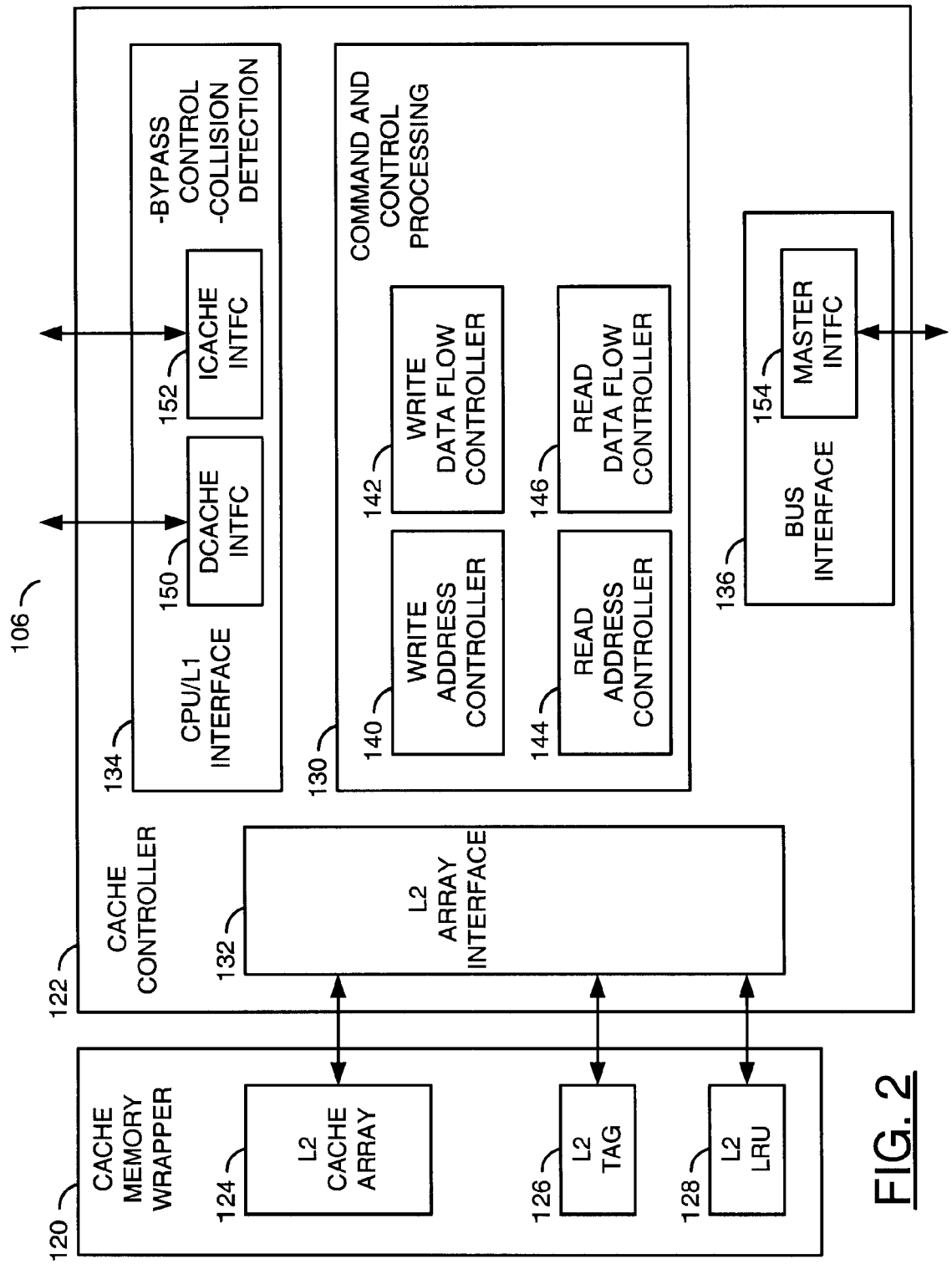
FIG. 2 is a block diagram of an example implementation of a cache controller in accordance with a preferred embodiment of the present invention.

Referring to FIG. 2, a block diagram of an example implementation of a circuit 106 is shown in accordance with a preferred embodiment of the present invention. The circuit 106 generally comprises a circuit 120 and a circuit 122. The circuits 120 to 122 may represent modules and/or blocks that may be implemented as hardware, software, a combination of hardware and software, or other implementations. In some embodiments, the circuit 104 may be implemented with a similar architecture to that of the circuit 106.

The circuit 120 may implement a cache memory wrapper. The circuit 120 is generally operational to provide storage, support tag lookup operations and support replacement operations. The circuit 120 generally comprises a circuit 124, a circuit 126 and a circuit 128. The circuits 124 to 128 may represent modules and/or blocks that may be implemented as hardware, software, a combination of hardware and software, or other implementations.

The circuit 124 may implement a memory array. The circuit 124 may be configured as N-way associative. The circuit 126 may implement a tag lookup memory. The circuit 126 may be used in detecting a cache hit or a cache miss in response to each access request concerning the circuit 124 received from the circuit 122. The circuit 128 may implement a replacement policy memory. The circuit 128 may be used in determining which cache line of the circuit 124 is to be replaced in response to a cache miss that triggers an allocation from the circuit 108. In some embodiments, the circuit 128 may implement a Least Recently Used (LRU) victim calculation. Other replacement policies may be implemented to meet the criteria of a particular application.

The circuit 122 generally implements a cache controller. In some embodiments, the circuit 122 implements an L2 cache controller. The circuit 122 generally comprises a circuit 130, a circuit 132, a circuit 134 and a circuit 136. The circuits 130 to 136 may represent modules and/or blocks that may be implemented as hardware, software, a combination of hardware and software, or other implementations.

The circuit 130 may implement a command and control processing circuit. The circuit 130 is generally operational to (i) detect one or more collisions among the access requests, (ii) create a queue containing the access requests that establish a speculative collision, (iii) perform a tag lookup of the speculative access requests using the circuit 126, (iv) delay line allocations for circuit 124 caused by a cache miss of the speculative access requests while a corresponding congruence class has at least N outstanding line fills in progress, (v) create another queue containing the access request that establish a true collision, (vi) perform a tag lookup of the true collision access requests one at a time using the circuit 126.

The circuit 130 generally supports multiple concurrent CPU access requests to the circuit 120. In some cases, the access requests may be ordered by an arrival time at the circuit 130. However, the order of completion may sometimes be different than the order of arrival. In other cases, the access requests are specified to complete in an order of arrival at the circuit 130. In general, any central processing unit (CPU) access request has a potential to have a collision with any other CPU access request. The circuit 130 may be operational to categorize collisions on CPU access requests into (i) the true collisions for access requests that are to remain in order, (ii) the speculative collisions for requests that may be allowed to complete in any order, but may have some other address dependency and (iii) no collision.

True collisions generally occur when two access requests are specified to be kept in the same order as the arrival order at the circuit 130. The circuit 130 generally allows a first event to complete before the second event is allowed access to the circuit 120. When multiple true collisions occur, all of the access requests may be serialized into a queue. The circuit 130 generally contains appropriate controls to (i) indicate when true collisions occur, (ii) serialize the true collision access requests and (iii) indicate when a current access request completes such that a next access request may be started. A true collision may be recorded for a new access request against each previous access request to be complete prior to the new access request being allowed access to the circuit 120. Most true collisions may be caused by multiple concurrent access requests to the same cache line in the circuit 124. However, some classes of instructions may have strict ordering criteria that may be treated as true collisions such that the ordering is maintained.

The circuit 130 may also perform speculative collision checking. A speculative collision generally occurs between two events that do not have an explicit order specified, but access the same congruence class in the cache (e.g., cache synonyms). Speculative collisions may only occur between cacheable operations that would trigger a cache line allocation if a cache miss is signaled during the tag lookup operation. An arbitrary order may be assigned to concurrent access requests with the speculative collision depending on the results of the tag lookup.

A speculative collision on an access request operation generally does not prevent that access request from being processed by the circuit 120. The access requests causing a speculative collision may utilize the circuit 126 to perform a tag array lookup with an indication that it has a speculative collision. If a given one of the access requests is a cache hit, the given access request may complete as normal. If the given access request is a cache miss, a cache line allocation may occur if room is available in corresponding congruence class. A variety of methods for tracking the number of cache line allocations that have already occurred may be implemented.

For example, the cache state may be set to pending or a separate status bit may be used to indicate that a cache entry is in a pending state waiting for a line fill. Other tracking methods may be implemented to meet the criteria of a particular application. If no cache line allocation takes place, the given access request may be retried later after the collision has been resolved. The collision may be resolved upon completion of a previous access request that created the speculative collision condition. The technique of holding of a new access request involved in a speculative collision until an existing access request completes may be similar to the technique applied to the true collisions and uses much of the same signaling.

The circuit 130 may include a circuit 140, a circuit 142, a circuit 144 and a circuit 146. The circuits 140 to 146 may represent modules and/or blocks that may be implemented as hardware, software, a combination of hardware and software, or other implementations. The module 140 may implement a write address controller that controls the addresses used to write to the circuit 120. The module 142 may implement a write data flow controller that may control the writing of data and instructions to the circuit 120. The module 144 may implement a read address controller that controls the addresses used to read from the circuit 120. The module 146 may implement a read data flow controller that controls the reading of data and instructions from the circuit 120.

The circuit 132 may implement an L2 array interface circuit. The circuit 132 is generally operational to provide communications between (i) the circuit 130 and the circuit 120 and (ii) the circuit 134 and the circuit 132. In some embodiments, the circuit 132 may communicate directly with each of the circuits 124, 126 and 128.

The circuit 134 may implement either a CPU interface circuit or an L1 cache interface circuit. The circuit 134 is generally operational to provide communications between the circuit 130 and either the circuit 102 or the circuit 104, depending on the design of the system. The circuit 134 may also be operational to detect collisions of simultaneous operations and control bypassing of the queuing operations within the circuit 130. The circuit 134 may have a data cache interface circuit 150 to transfer data words and an instruction cache interface 152 to transfer instructions.

The circuit 136 may implement a bus interface circuit. The circuit 136 is generally operational to provide communications between the circuit 130 and the bus 110. In some embodiments, the circuit 136 may operate as a PLB6 bus interface. Other types of bus interfaces may be implemented to meet the criteria of a particular application. The circuit 136 may have a master interface circuit 154 for normal communications on the bus 110.

Figure 3:
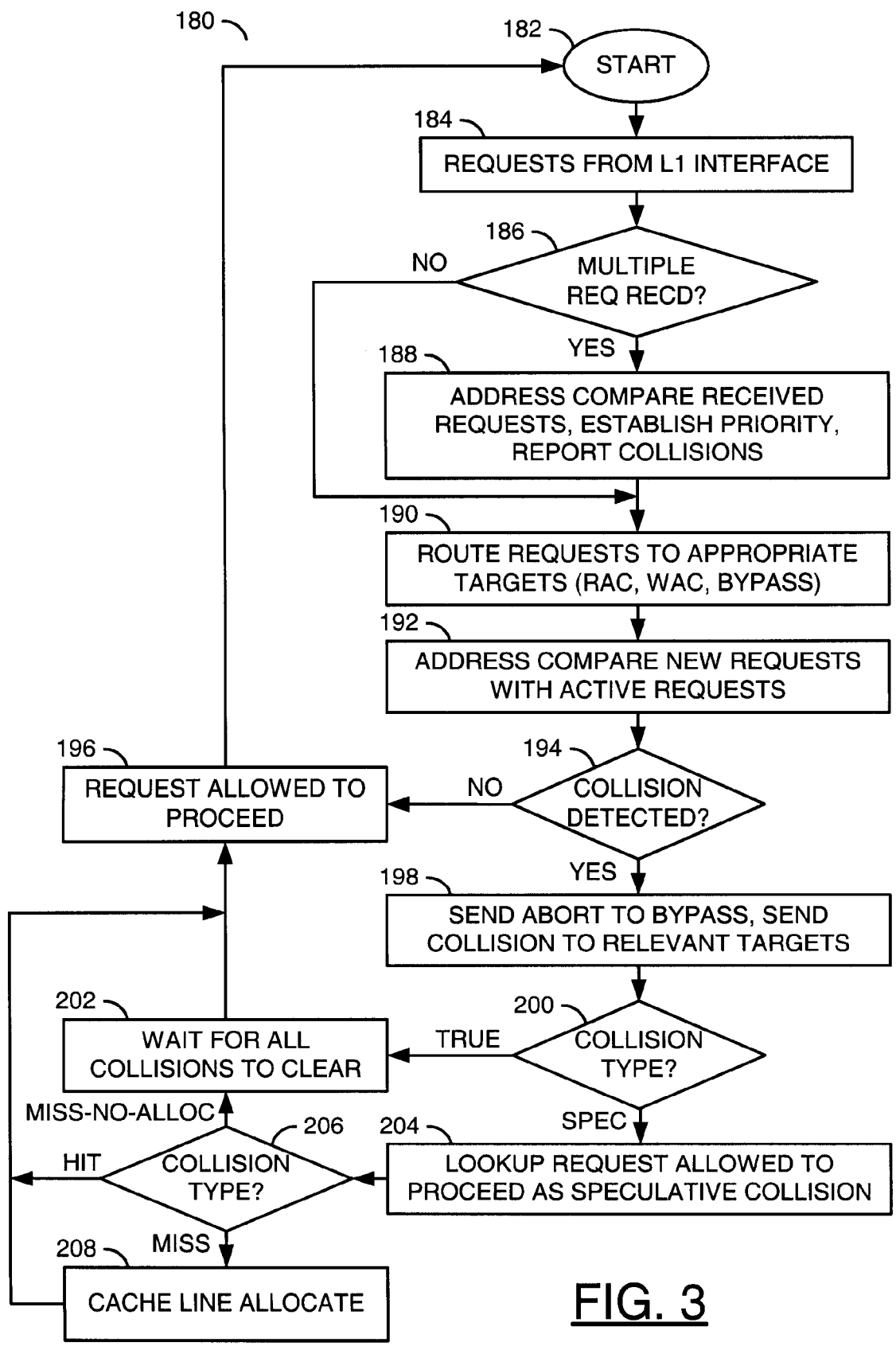
FIG. 3 is a flow diagram of an example implementation of a method to manage cache line allocations.

Referring to FIG. 3, a flow diagram of an example implementation of a method 180 to manage cache line allocations is shown. The method 180 generally comprises a step 182, a step 184, a step 186, a step 188, a step 190, a step 192, a step 194, a step 196, a step 198, a step 200, a step 202, a step 204, a step 206 and a step 208. The steps 182 to 208 may represent modules and/or blocks that may be implemented as hardware, software, a combination of hardware and software, or other implementations. The method 180 may be implemented in the circuits 106 and/or the circuits 104.

The method 180 generally begins with the step 182 where the circuit 106 is in communication with the corresponding circuit 104 waiting for new access requests. The circuit 130 generally receives one or more access requests at a time through the circuit 134 from the circuit 104 in the step 184. If multiple requests are received concurrently or nearly simultaneously (e.g., the YES branch of step 186), the circuit 134 may compare the addresses of the just-received requests with each other in the step 188. If address collisions are detected, a priority of the access requests may be established by the circuit 134 and the collisions reported by the circuit 134 in the step 188. Thereafter, the circuit 130 may route the access requests to the appropriate target controllers 140 and 144 in the step 190. If no address collisions are detected (the NO branch of step 186), the method 180 may continue with the routing of the access requests in the step 190. Different request types generally have different target destinations and yet all of the cacheable access requests eventually propagate to the circuit 120.

In the step 192, the receiving target controllers may compare the addresses of the new access requests with the addresses of active requests. All of the new access requests may be compared against all of the outstanding requests, regardless of the target destinations. If no collisions are detected (e.g., the NO branch of step 194), the circuit 130 may pass the new cacheable access request through the circuit 132 to the circuit 124 where servicing is performed in the step 196. The method 180 may subsequently loop back to the step 182 to await more access requests. If one or more collisions are detected (e.g., the YES branch of step 194), an abort message may be sent to the relevant circuits 140-146. Although bypass type access requests may normally be sent directly from the circuit 134 to the circuit 132, such bypass requests may still be subject to the collision detection operations described above. As such, the abort signal may be used to stop the bypass requests from being sent directly to the circuit 132. Collision information is generally shared by the target controllers, including collisions between access requests that end in different targets. Each particular one of the target controllers may also track collisions between the access requests managed by the particular target controller.

In the step 200, the circuits 144 and 146 generally determine what types of collisions have been detected. The circuit 134 may also determine some types of collisions and pass the determinations on to the circuit 144 and 146 for use in the step 200. For each true collision detected (e.g., the TRUE branch of step 200), the target controller may place the corresponding access requests in a queue, send one of the requests at a time to the circuit 132 per the proper order and wait for the collisions to clear in the step 202. Each of the access requests sent to the circuit 132 may be processed by the circuit 132 in the step 196.

For each speculative collision detected (e.g., the SPEC branch of step 200), the target controller may queue the corresponding requests to the circuit 132 where a tag lookup is performed in the step 204. If the tag lookup is a cache miss (e.g., the MISS branch of the step 206), the circuit 132 may initiate a cache line allocation to obtain the corresponding cache line from a downstream memory (e.g., the circuit 108 through the circuit 154). Once the requested cache line has been filled with the up-to-date information, processing of the access request may proceed as normal by the circuit 132 in the step 196. If the tag lookup results in a cache miss but does not initiate a cache line allocation (e.g., the MISS-NO-ALLOC branch of the step 206), the access request may be held in the step 202 until the collision clears. The MISS-NO-ALLOC condition generally occurs where the intended congruence class in the N-way circuit 124 currently has N outstanding line fills in progress.

The various embodiments of the present invention generally provide two types/classes of collision detections, true collisions and speculative collisions. Two types/classes cache misses may be permitted, cache misses with allocation and cache missed without allocation. Furthermore, an implied ordering of the speculative collisions generally allows safe and orderly access to the cache. Therefore, some embodiments of the present invention may avoid situations where a cache allocation is appropriate, but the congruence class has no room for an allocation because of pending line fills. Performance (latency) of the caching operations is improvement because (i) loads to consecutive addresses are allowed to stream, (ii) loads to unrelated addresses are allowed to stream, (iii) load and store ordering rules may be maintained, (iv) hit-after-miss access to unrelated addresses in the same congruence class are allowed and (v) some miss-after-miss accesses to unrelated addresses in the same congruence class are allowed.

Some embodiments of the present invention may provide alternate implementations from what is described above. For example, instead of tracking the number of pending line fills, the circuit 106 may report a Miss-No-Allocate on any cache request that is a miss and the request is a speculative collision. Therefore, at most a single line fill per congruence class may be pending at any given time. The techniques described above may be applied to (i) any one or more levels of a cache system (e.g., L1, L2 and/or L3), (ii) caches with any number of associativity classes (e.g., 2-way 4-way, 8-way, 16-way) and (iii) any processor system type. Furthermore, PowerPC "weak" consistency load and store ordering rules may be followed. The techniques utilizing the true collisions and the speculative collisions may also be applied to other systems with different rules.

The example implementation of the circuit 106 generally places the detection of the collisions inside the circuit 122 and outside the L2 array interface control. However, other implementations may have the detection logic inside the array controller to meet the criteria of a particular application. The example implementations may also report a Miss-No-Allocate on a speculative collision when the cache does not perform a cache line allocate due to outstanding pending line fills. The same technique may be expanded to allow any number of allocates and line fills (up to the associativity of the cache) to be pending at a time.

The functions performed by the diagrams of FIGS. 1-3 may be implemented using one or more of a conventional general purpose processor, digital computer, microprocessor, microcontroller, RISC (reduced instruction set computer) processor, CISC (complex instruction set computer) processor, SMID (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application. As used herein, the term "simultaneous" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a cache configured as N-way associative; and
   a controller circuit configured to (i) detect one of a cache hit and a cache miss in response to each of a plurality of access requests to said cache, (ii) detect a collision among said access requests, (iii) queue at least two first requests of said access requests that establish a speculative collision, said speculative collision occurring where said first requests access a given congruence class in said cache and (iv) delay a line allocation to said cache caused by a cache miss of a given one of said first requests while said given congruence class has at least N outstanding line fills in progress.

2. The apparatus according to claim 1, further comprising a multiple issue processor configured to generate said access requests that cause said collision.

3. The apparatus according to claim 1, wherein said controller circuit is further configured to end said delay of said line allocation when no more than said N outstanding line fills are in progress.

4. The apparatus according to claim 1, wherein said cache is accessed in response to said cache hit of said given first request independent of a number of said outstanding line fills in progress.

5. The apparatus according to claim 1, wherein said line allocation corresponding to said cache is performed in response to said cache miss of said given first request while said given congruence class has less than said N outstanding line fills in progress.

6. The apparatus according to claim 1, wherein said controller circuit is further configured to queue in a particular order at least two second requests of said access requests that establish a true collision, said true collision occurring where said second requests are specified to access said cache in said particular order.

7. The apparatus according to claim 6, wherein said particular order comprises an arrival order at said controller circuit.

8. The apparatus according to claim 1, wherein said controller circuit is further configured to queue in a particular order at least two second requests of said access requests that establish a true collision, said true collision occurring where said second requests access a single cache line concurrently.

9. The apparatus according to claim 1, wherein said controller circuit is further configured to (i) receive a plurality of new requests of said access requests and (ii) compare a plurality of addresses between said new requests and one or more active requests of said access requests to determine said collision.

10. The apparatus according to claim 1, wherein said controller circuit is further configured to (i) receive a plurality of new requests of said access requests and (ii) compare a plurality of addresses among said new requests to determine said collision.

11. A method of managing line allocations, comprising the steps of:
   (A) detecting a collision among a plurality of access requests to a cache using a controller circuit, said cache configured as N-way associative;
   (B) queuing at least two first requests of said access requests that establish a speculative collision in a controller circuit, said speculative collision occurring where said first requests access a given congruence class in said cache; and
   (C) delaying a line allocation to said cache caused by a cache miss of a given one of said first requests is delayed while said given congruence class has at least N outstanding line fills in progress.

12. The method according to claim 11, further comprising the step of:
   generating said access requests that cause said collision using a multiple issue processor.

13. The method according to claim 11, further comprising the step of:
   ending said delay of said line allocation when no more than said N outstanding line fills are in progress.

14. The method according to claim 11, further comprising the step of:
   accessing said cache in response to said cache hit of said given first request independent of a number of said outstanding line fills in progress.

15. The method according to claim 11, further comprising the step of:
   performing said line allocation to said cache in response to said cache miss of said given first request while said given congruence class has less than said N outstanding line fills in progress.

16. The method according to claim 11, further comprising the step of:

queuing in a particular order at least two second requests of said access requests that establish a true collision, said true collision occurring where said second requests are specified to access said cache in said particular order.

17. The method according to claim 16, wherein said particular order comprises an arrival order at said controller circuit.

18. The method according to claim 11, further comprising the step of:

queuing in a particular order at least two second requests of said access requests that establish a true collision, said true collision occurring where said second requests access a single cache line concurrently.

19. The method according to claim 11, further comprising the steps of:

receiving a plurality of new requests of said access requests; and comparing a plurality of addresses between said new requests and one or more active requests of said access requests to determine said collision.

20. An apparatus comprising:

means for caching configured as N-way associative; and means for controlling configured to (i) detect one of a cache hit and a cache miss in response to each of a plurality of access requests to said means for caching, (ii) detect a collision among said access requests, (iii) queue at least two first requests of said access requests that establish a speculative collision, said speculative collision occurring where said first requests access a given congruence class in said means for caching and (iv) delay a line allocation to said means for caching caused by a cache miss of a given one of said first requests while said given congruence class has at least N outstanding line fills in progress.

\* \* \* \* \*